Aug. 31, 1965     L. J. HEGEDUS     3,203,100
CHECKING FIXTURES AND METHOD OF MAKING
Filed Oct. 28, 1960     5 Sheets-Sheet 1
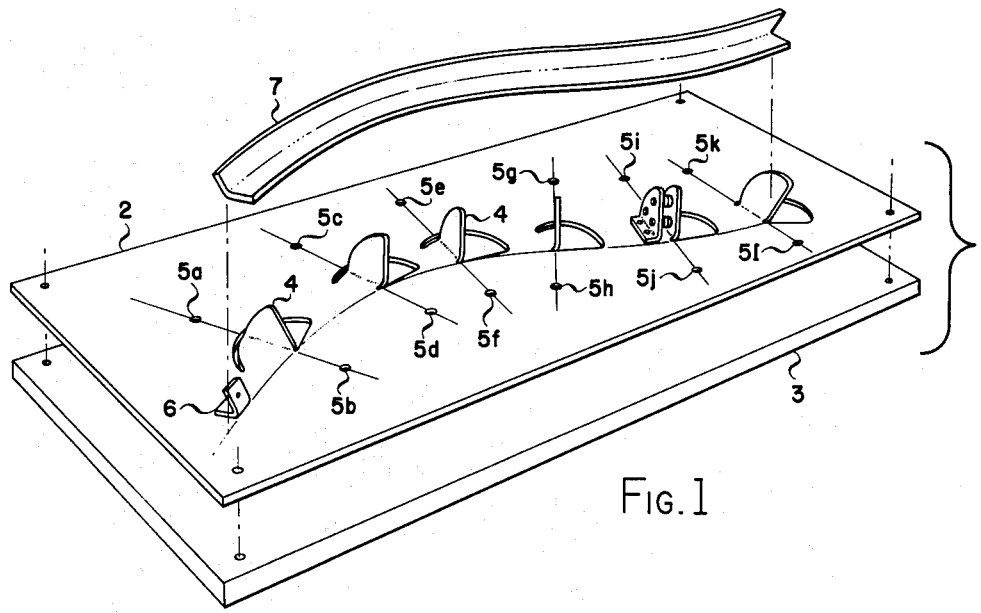
Fig.1
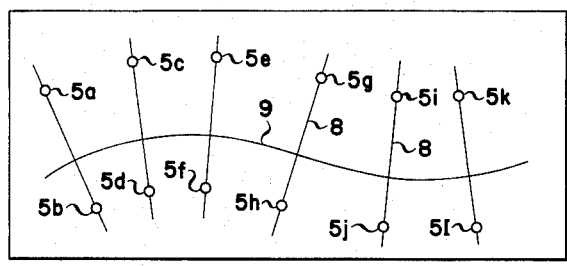
Fig.2
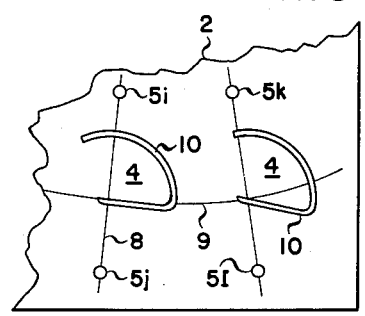
Fig.3
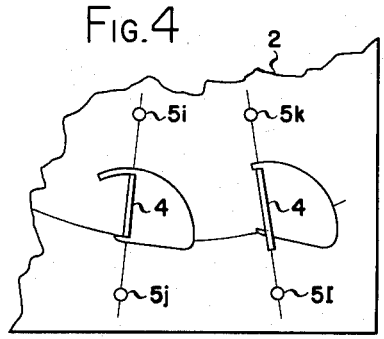
Fig.4
*INVENTOR.*
LOUIS J. HEGEDUS
Agent INVENTOR.
LOUIS J. HEGEDUS
BY
Agent Aug. 31, 1965   L. J. HEGEDUS   3,203,100
CHECKING FIXTURES AND METHOD OF MAKING
Filed Oct. 28, 1960   5 Sheets-Sheet 4

INVENTOR.
LOUIS J. HEGEDUS
BY
George A. Sullivan
Agent

Aug. 31, 1965   L. J. HEGEDUS   3,203,100
CHECKING FIXTURES AND METHOD OF MAKING
Filed Oct. 28, 1960   5 Sheets-Sheet 5

*INVENTOR.*
LOUIS J. HEGEDUS
BY
Agent

United States Patent Office 3,203,100
Patented Aug. 31, 1965

3,203,100
CHECKING FIXTURES AND METHOD
OF MAKING
Louis J. Hegedus, Marietta, Ga., assignor to Lockheed
Aircraft Corporation, Burbank, Calif.
Filed Oct. 28, 1960, Ser. No. 65,713
5 Claims. (Cl. 33—174)

This invention relates to a checking fixture apparatus and method of making, and more specifically concerns a contour and/or face angle comparison checking fixture produced from sheet or plate stock wherein the angle check gauges are formed from the base sheet or plate to remain integral therewith and the method of manufacture of such fixtures.

Prior art checking fixtures include arrangements whereby a plurality of high precision gauge members are machined from appropriately sized stock and then mounted upon a base plate. Fixtures of this type are both exceedingly time consuming to make and expensive, for not only is an exacting layout on the base plate required for establishing the proper and exact locations for each of the gauge blocks, but each gauge block requires a likewise exacting layout thereof to establish the proper and exact locations for mounting devices to mount the gauge blocks to the base. This duplicatious work is most necessary to assure an acceptable checking fixture as the end result for, if one gauge block is "off" or out of limits or tolerance either in shape, size or location, or the base plate layout is out of limits or tolerance, the investment in that piece of tooling is either completely lost or has to be further increased for correction.

Accordingly, it is an object of this invention to provide a checking fixture that is relatively inexpensive and easy to manufacture.

It is a further object of this invention to provide a method of manufacturing a relatively inexpensive checking fixture by a fast and most exacting and thorough method.

A still further object of this invention is to provide a completely manufactured checking fixture and an accurate method for making such without the absolute necessity or requirement of a template of the part to be checked.

Further objects and advantages of this invention will become apparent from the following description taken in connection with the accompanying drawings in which:

FIGURE 1 is an exploded perspective view showing the relative position relationship between one embodiment of a checking fixture of this invention, its support, and a contoured part whose contour and shape is to be checked on the fixture;

FIGURES 2, 3 and 4 represent a step by step procedure for forming the gauge tab portions from the fixture base plate;

Figure 11:
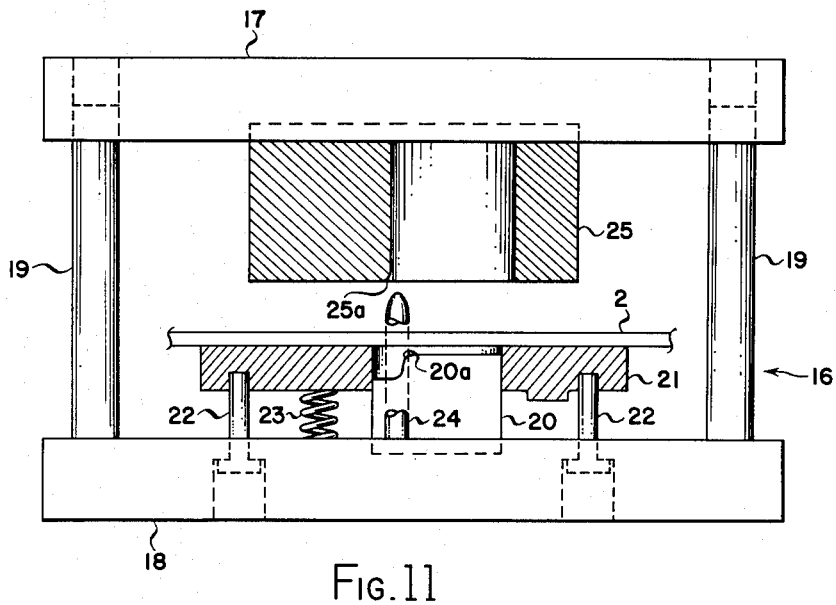
Figure 12:
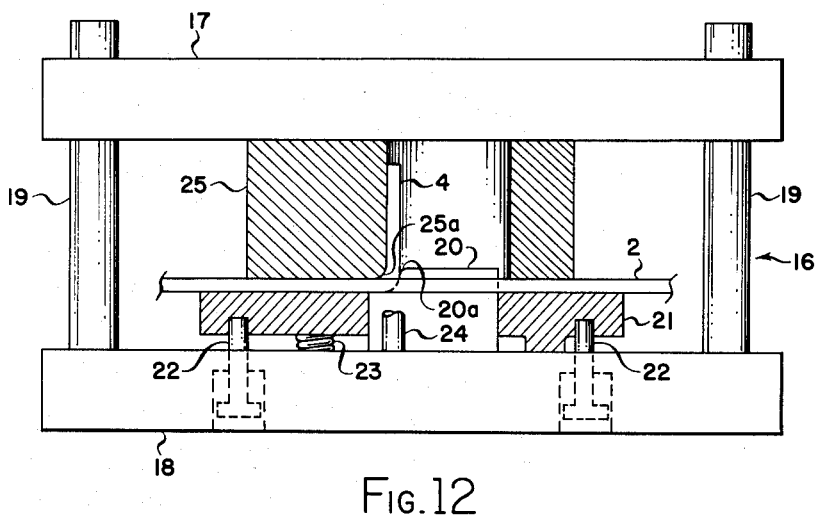
Figure 13:
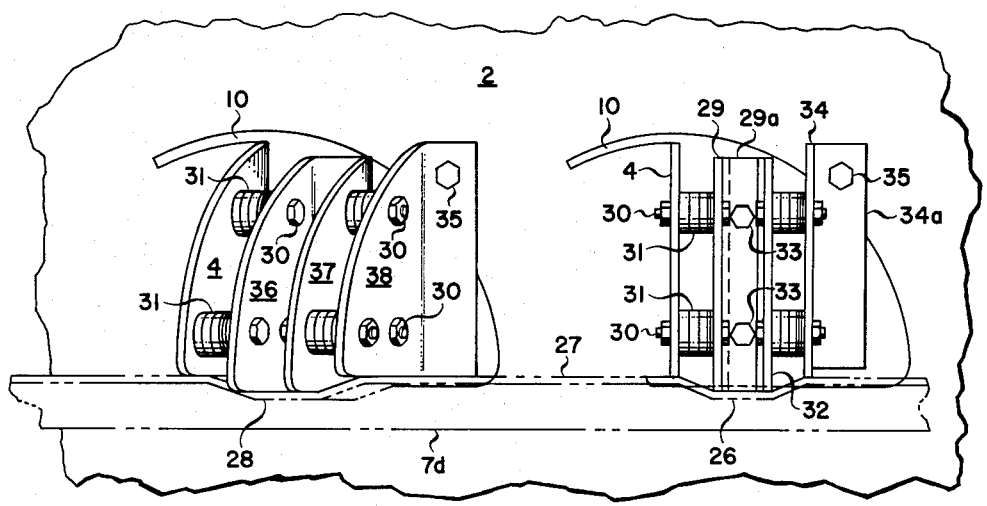
Figure 14:
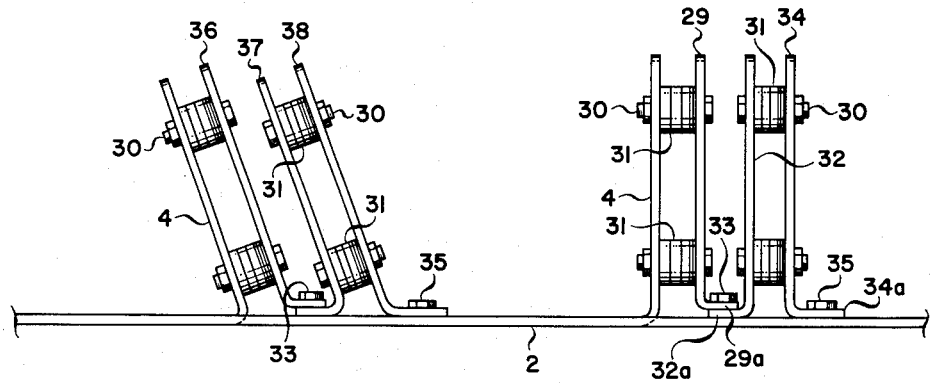

FIGURES 11 and 12 show the punch press tooling for deflecting the tab portions formed by the punch in FIG-URE 10 into a position perpendicular to the plane of the base plate to form the gauge tabs; and FIGURES 13 and 14 indicate another embodiment of this invention wherein by the addition of spaced face or angle gauge members connected to one that is integral with the base plate, joggles or offsets in the workpiece can be checked on the checking fixture.

Generally stated, the invention concerns a checking fixture having at least one face or angle gauge integral with a base plate, the face or angle gauges being formed from the base plate proper by a blanking punch followed by a forming punch. The blanking punch results in the formation of a tab portion in the plane of the base plate, and it is this tab portion which forms the gauge member when it is bent out of the plane of the base plate; the combination of blanking and forming operations being variable whereby the gauge may have an open or closed face relative to the face plate normal as well as side or lateral angulations of the gauge tabs relative to the base plate normal.

Referring more particularly to the drawings, FIGURE 1 shows a checking fixture assembly 1 comprising a base plate 2 which may be of relatively thin sheet material and mounted to a fixture support 3 by any appropriate means for imparting support and rigidity to base plate 2. A plurality of angle gauges or gauge tabs 4 project upwardly or out of the plane of base plate 2 and are achieved by a method and apparatus as explained in more detail hereinafter. For each of the gauge tabs 4 there is a pair of indexing holes 5a–b, 5c–d, 5e–f, etc., through 5k–l, also the purpose of which will be explained in more detail hereinafter. A prick punch locator 6 is mounted on base plate 2 and serves as a locating means for a part or workpiece 7 to be checked on the fixture by aligning the prick punch on the part 7 with the locator 6.

FIGURE 2 shows a layout and location of indexing holes 5a through 5l in base plate 2 from which the tabs 4 will be formed as explained in more detail hereinafter. It is to be noted that the lines 8 connecting each pair of holes are perpendicular to a line 9 which represents the contour of the part the fixture will check, or in other words, the contour of the checking surface of the workpiece 7. Accordingly, as can best be seen in FIGURE 2, when adjacent connecting lines 8 have a relationship to each other other than being parallel, it means the surface contour between such lines is other than a straight line.

Figure 10:
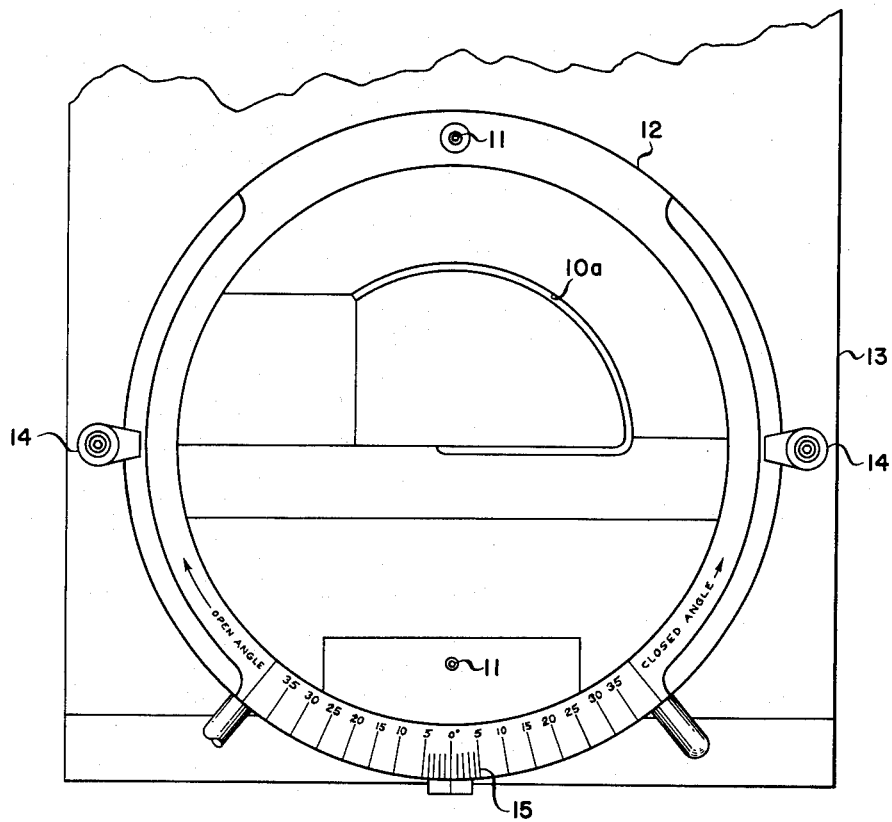
FIGURE 10 shows features of an adjustable base for a punch press used for forming the gauge tabs having either normal, open or closed faces.

FIGURE 10 shows the bed or bottom platen of a blanking punch having a die opening 10a for blanking or punching an opening 10 in base plate 2 between each pair of indexing holes; the shape of blank opening 10 best being seen in FIGURES 3 and 10 and forms the outer surface or contour of gauge tabs 4. A pair of locating pins 11 are mounted on a ring 12 which is free to rotate around base 13 and the stationary die opening 10a. Ring 12 may be locked to base 13 by a pair of clamp locks 14 which are mounted to base 13 through a threaded bolt connection; it being understood that any appropriate type lock means could be used as the only requirement is that a means should be provided to prevent rotation of ring 12 relative to base 13 during the blanking operation to form one of the gauge tabs 4. The piercing of base plate 2 to form the blank opening 10 is accomplished by mounting the base plate 2 on the ring 12 by the pins 11 being located in the pair of indexing holes 5*i–j* or 5*k–l* as shown in FIGURE 3. The control of whether the face gauge tabs 4 are normal to the plane of base plate 2 or angulated thereto is accomplished by the rotation of the ring 12, which in turn rotates the pins 11 upon which base plate 2 is mounted through the indexing holes, for as the ring 12 is rotated relative to the die opening 10*a*, the base plate 2 will also be rotated relative to the die opening 10*a*. In other words, looking at the ring 12 and die opening 10*a* as seen in FIGURE 10, a blanking operation on base plate 2 with indexing holes 5*i–j* located on the pins 11 will result in the formation of a gauge tab 4 as seen in FIGURE 3. A rotation of the ring 12 relative to the die opening 10*a* in a counterclockwise direction will result in a rotation of the gauge tab 4 in a clockwise direction relative to the line extending between the two indexing holes, which can be clearly seen by the gauge tab 4 relative to indexing holes 5*k–l* in FIGURE 3, and which in turn will result in a closed angle gauge face as will be more clearly seen later on. Likewise, the rotation of ring 12 in a clockwise direction will result in the rotation of the outline of gauge tab 4 in a counterclockwise direction relative to the line extending between a pair of indexing holes which will result in an open angle gauge face.

After the blank openings 10 are pierced in base plate 2 to form the outline or contours of gauge tabs 4, the tabs 4 are then formed by bending upwardly out of the plane of base plate 2 by a form die 16 as shown in FIGURES 11 and 12. Form die 16 comprises upper and lower platens 17 and 18, the direction of relative movements between them being guided by guides 19 mounted on lower platen 18. A forming block 20 is mounted on lower platen 18. A ring member 21 surrounds forming block 20 and is connected to lower platen 18 by a plurality of connecting guide means 22 which in turn prevent the upper travel of ring member 21 caused by the biasing of a plurality of springs 23 (only one of which is shown) beyond a point where the upper surface of ring member 21 is slightly above the upper surface of forming block 20 as can best be seen in FIGURE 11.

Also mounted on lower platen 18 is a pair of locating pins 24 which serve to locate base plate 2 in the proper position on ring member 21 by placement of the pins 24 in the pair of indexing holes for the gauge tab 4 to be formed. A forming ring 25 is connected to the upper platen 17 and is shaped to cooperate with the forming block 20 whereby as platen 17 is moved downwardly toward lower platen 18, the bottom of forming ring 25 comes into contact with the upper surface of base plate 2 and the continuation of upper platen 17 in a downward movement causes downward movement of base plate 2 and ring member 21 relative to forming block 20 whereby the corner 20*a* of forming block 20 and the corner 25*a* of forming ring 25 cooperate to deflect the gauge tab 4 by bending it upwardly so as to extend substantially at right angles from the plane of base plate 2, as can best be seen in FIGURES 4 and 12. By the proper location of the locating pins 24 with the forming block 20 and forming ring 25, the forming or bending axis of tab 4 will lie along the straight line extending between the two indexing holes. By combining this feature with the previous feature of being able to rotate the base plate for the blanking of the gauge tabs 4, there results a direct control of the degree of open or closed gauge faces.

Figure 5:
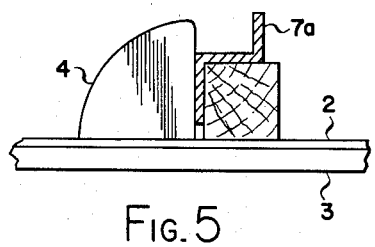
FIGURES 5, 6 and 7 show the principles of a normal, closed and open gauge face plate respectively.
Figure 6:
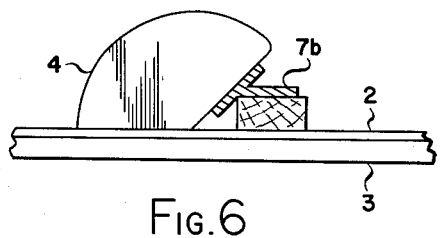
Figure 7:
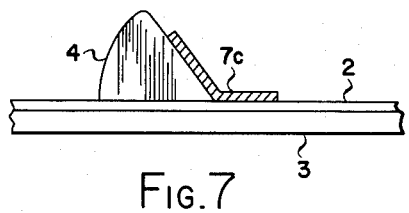

Referring to FIGURES 5, 6 and 7, there is shown respectively the angle gauges or gauge tabs 4 having normal, closed and open faces respectively. From the foregoing explanation of the formation of gauge tabs 4 with the blanking and forming operations as performed by the apparatus shown and discussed in FIGURES 10, 11 and 12, it can readily be seen how the rotation of index holes relative to the die opening 10*a* on the apparatus of FIGURE 10, in combination with the forming operation by the form die 16 in FIGURES 11 and 12 through a fixed bend axis, controls the face angle of gauge tabs 4 and thus may be varied and controlled to fit the various types of workpieces being checked as indicated by workpieces 7*a*, 7*b* and 7*c* in FIGURES 5, 6 and 7 respectively.

Figure 8:
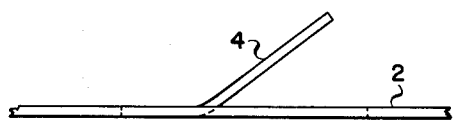
FIGURES 8 and 9 show variations of lateral angulation of the gauge tabs relative to the face plate.
Figure 9:
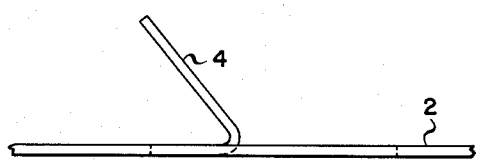

It is also to be understood that in addition to the variations in the face angle of gauge tabs 4, there may also be variation in what is termed the side angle as represented by FIGURES 8 and 9, wherein FIGURE 8 shows a closed side angle and FIGURE 9 shows an open side angle; the differences of the closed and open side angles referring to the amount of deflection of gauge tabs 4 out of the plane of base plate 2 being less than 90° and more than 90° respectively. The variations in side angles are controlled by an appropriate variation in the design of the forming block 20 and forming ring 25 as shown in FIGURES 11 and 12, or by controlling the depth travel of forming ring 25.

FIGURES 13 and 14 show a further embodiment whereby an assembly of angle gauges can be built up to check contour joggles in the workpiece being checked. In FIGURE 13, a workpiece 7*d* is shown with a vertical joggle 26 in flange 27 and a side angled joggle 28. The gauge assembly for the vertical joggle 26 is formed by an angle gauge member 29 having a flange 29*a* at the bottom end thereof, the member 29 being mounted to the gauge tab 4 by a plurality of any appropriate connecting means 30. The lateral spacing between tab 4 and gauge member 29 is accomplished by the use of washer type spacers 31 located therebetween. Another angle gauge member 32 having flange 32*a* at the lower end thereof is connected to gauge member 29 by fastener means 33 connecting the two flanges 29*a* and 32*a* together. Likewise, an angle gauge member 34 having a flange 34*a* is connected to gauge member 32 by connecting means 30 and spacers 31. Gauge member 34 is in turn connected to base plate 2 by a connecting means 35 passing through flange 34*a* and base plate 2. The joggle checking assembly of gauge members 29, 32 and 34 extends normally from the plane of base plate 2 by virtue of the normal extension of the gauge tab 4 associated with the gauge members 29, 32 and 34.

The second joggle gauge assembly for joggle 28 as shown in FIGURES 13 and 14 is similar to the assembly for joggle 26 in that angle gauge members 36, 37 and 38 are all interconnected to integral gauge tab 4 by fastening means 30, 33 and 35 with spacers 31, the only difference being that the angle gauge tab 4 for joggle 28 is at a lateral or side angle rather than being vertical or normal to the plane of base plate 2.

Thus it can be seen there is provided a relatively cheap and easily manufactured checking fixture for contoured parts in which a substantial variety of shapes and contours can be checked. It is also to be understood that a further modification may be employed wherein alternate angle gauge tabs 4 may be blanked and formed so as to provide a gap between the angle face of a part in which a go-no go feeler gauge may be employed to determine whether the workpiece contour is within any plus or minus tolerances for the part.

While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed is:

1. A one piece tooling fixture for checking a workpiece surface contour comprising: a base plate, a plurality of gauge tabs extending outwardly from the plane of the base plate, said tabs originally a portion of the base plate within the plane thereof and formed by perforation in the base plate to outline the contours of the tabs and bending of said tabs out of the base plate plane, said tabs when bent out of the base plate plane remaining an integral part of said base plate, each of said tabs formed by perforation of said base plate having an edge rim of a width that is substantially the thickness of the base plate, a portion of said edge rim of each said gauge tab forming an angle gauge face for checking the surface contour of a workpiece at a predetermined location on the workpiece.

2. A tooling fixture as claimed in claim 1 wherein at least some of the gauge tab planes are normal to the base plate plane.

3. A tooling fixture as claimed in claim 1 wherein at least some of the gauge tab planes are at an angle other than normal to the base plate plane.

4. A tooling fixture as claimed in claim 1 wherein at least some of the angle gauge faces are normal to the base plate plane.

5. A tooling fixture as claimed in claim 1 wherein at least some of the angle gauge faces are at an angle other than normal to the base plate plane.

References Cited by the Examiner

UNITED STATES PATENTS

| | | | |
|---|---|---|---|
| 929,083 | 7/09 | Geahart | 33—174 |
| 2,697,997 | 12/54 | Burroughs | 113—116 |
| 2,699,134 | 1/55 | Maxwell | 133—116 |
| 2,776,493 | 1/57 | Jerand | 33—174 |
| 2,807,092 | 9/57 | Jones | 33—174 |
| 2,960,776 | 11/60 | Cannata | 33—174 |

ISAAC LISANN, *Primary Examiner.*